United States Patent
Gu et al.

(10) Patent No.: US 10,421,626 B2
(45) Date of Patent: Sep. 24, 2019

(54) CONVEYING APPARATUS AND TRANSMITTING SYSTEM

(71) Applicant: ABB Schweiz AG, Baden (CH)

(72) Inventors: Hao Gu, Shanghai (CN); Zhaofu Chi, Shanghai (CN); Jibo Yang, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/934,065

(22) Filed: Mar. 23, 2018

(65) Prior Publication Data
US 2018/0208414 A1    Jul. 26, 2018

Related U.S. Application Data

(63) Continuation of application No. PCT/EP2016/070230, filed on Aug. 26, 2016.

(30) Foreign Application Priority Data

Sep. 24, 2015 (CN) .......................... 2015 1 0617644

(51) Int. Cl.
*B65G 54/02* (2006.01)
*H02K 49/10* (2006.01)
(Continued)

(52) U.S. Cl.
CPC ............ *B65G 54/02* (2013.01); *B65G 13/04* (2013.01); *B65G 23/23* (2013.01); *H02K 49/102* (2013.01)

(58) Field of Classification Search
CPC .. B65G 54/02; G03G 15/08; H01L 21/67709; H01L 21/67706
(Continued)

(56) References Cited

U.S. PATENT DOCUMENTS 4,241,605 A    12/1980 Hendriks et al.
5,377,816 A    1/1995 Deligi et al.
(Continued)

FOREIGN PATENT DOCUMENTS

CN    1674419 A    9/2005
CN    1841695 A    10/2006
(Continued)

OTHER PUBLICATIONS

European Patent Office, International Search Report & Written Opinion issued in corresponding Application No. PCT/EP2016/070230, dated Nov. 29, 2016, 14 pp.
(Continued)

*Primary Examiner* — James R Bidwell
(74) *Attorney, Agent, or Firm* — Taft Stettinius & Hollister LLP (57) ABSTRACT

The present disclosure provides a conveying apparatus and a transmitting system. The conveying apparatus includes: a magnetic rack movable along a first direction, having a plurality of magnetic rack magnetic teeth arranged in the first direction, adjacent ones of the magnetic rack magnetic teeth having different polarities; at least one first magnetic gear rotatable about at least one first axis, respectively, wherein each first magnetic gear has a plurality of first magnetic gear magnetic teeth and adjacent ones of the first magnetic gear magnetic teeth have different polarities; at least one second magnetic gear rotatable about at least one second axis, wherein each second magnetic gear has a plurality of second magnetic gear magnetic teeth and adjacent ones of the second magnetic gear magnetic teeth have different polarities; wherein: at least one first magnetic gear, in combination with at least one second magnetic gear, forms at least one magnetic gear set, respectively; the magnetic rack and second magnetic gear may magnetically (Continued)

engage in a non-contact state with different first magnetic gear teeth of the first magnetic gear belonging to the same magnetic gear set via the magnetic rack magnetic teeth and the second magnetic gear teeth, respectively; and when the at least one second magnetic gear is used as a driving gear to output power, the power may be transmitted to the magnetic rack through at least one first magnetic gear so as to move it along the first direction.

14 Claims, 11 Drawing Sheets

(51) Int. Cl.
  *B65G 13/04* (2006.01)
  *B65G 23/23* (2006.01)
(58) Field of Classification Search
  USPC .......... 198/619, 805; 414/217, 218; 399/253
  See application file for complete search history.

(56) References Cited

U.S. PATENT DOCUMENTS

| | | | | |
|---|---|---|---|---|
| 5,881,649 | A * | 3/1999 | Hasegawa | H01L 21/67709 198/619 |
| 5,899,320 | A | 5/1999 | Miyasaka | |
| 6,206,176 | B1 * | 3/2001 | Blonigan | H01L 21/67709 198/619 |
| 6,561,343 | B2 * | 5/2003 | Miyauchi | H01L 21/67709 198/619 |
| 7,597,186 | B2 * | 10/2009 | Chung | G03G 15/6529 198/619 |
| 7,770,714 | B2 * | 8/2010 | Nozawa | H01L 21/67173 198/619 |
| 2008/0038020 | A1 | 2/2008 | Chung et al. | |
| 2015/0243539 | A1 * | 8/2015 | Hosek | F16D 3/00 414/218 |

FOREIGN PATENT DOCUMENTS

| | | |
|---|---|---|
| CN | 203112145 U | 8/2013 |
| CN | 205346334 U | 6/2016 |
| DE | 102012207007 A1 | 10/2013 |
| JP | S619104 A | 1/1986 |
| JP | S6260702 A | 3/1987 |
| JP | S63262325 A | 10/1988 |
| JP | H07177724 A | 7/1995 |
| JP | 03807094 A | 11/1996 |
| JP | 2000142935 A | 5/2000 |
| JP | 2005272102 A | 10/2005 |
| JP | 2007015834 A | 1/2007 |
| JP | 2008074505 A | 4/2008 |
| WO | 2005063600 A1 | 7/2005 |

OTHER PUBLICATIONS

Intellectual Property Office of the P.R. China, First Office Action issued in corresponding Application No. 201510617644.X, dated Dec. 26, 2016, 10 pp.
Japanese Office Action, Japanese Patent Application No. 2018515562, dated Feb. 19, 2019, 6 pages which includes translation in English.

* cited by examiner

CONVEYING APPARATUS AND TRANSMITTING SYSTEM

FIELD OF THE INVENTION

The present invention relates to a conveying apparatus and a transmitting system, and more specifically, to a conveying apparatus and a transmitting system using magnetic force.

BACKGROUND OF THE INVENTION

In Computer, Communication and Consumer (3C) industries, a product needs to be assembled in a dustless environment. For example, as far as screen assembly is concerned, in order to achieve a higher dustless degree, a screen panel needs to be carried and conveyed by a supporting member in a clean room. Generally, the supporting member is driven by a rack-pinion mechanism through mechanical engagement or driven by a belt, a roller, and a link plate through friction. In this case, particles generated by mechanical engagement or friction cannot be ignored.

In order to reduce the particles, the Patent JPS619104A discloses a material conveying system for a clean room. The system includes an electromagnet that may travel along a guide rail, and a tray located in the clean room for supporting materials. The tray may be magnetically coupled with the electromagnet so as to be suspended in the clean room and kept a certain distance away from the electromagnet. Because electromagnetic control is needed to make the tray and the materials thereon suspended in the clean room and movable in accordance with the motion of the electromagnet, the system is relatively complex.

SUMMARY OF THE INVENTION

According to one aspect of the present invention, there is provided a conveying apparatus, including: a magnetic rack movable along a first direction, having a plurality of magnetic rack magnetic teeth arranged in the first direction, adjacent ones of the magnetic rack magnetic teeth having different polarities; at least one first magnetic gear rotatable about at least one first axis, respectively, wherein each first magnetic gear has a plurality of first magnetic gear magnetic teeth and adjacent ones of the first magnetic gear magnetic teeth have different polarities; and at least one second magnetic gear rotatable about at least one second axis, wherein each second magnetic gear has a plurality of second magnetic gear magnetic teeth and adjacent ones of the second magnetic gear magnetic teeth have different polarities; wherein: at least one first magnetic gear, in combination with at least one second magnetic gear, forms at least one magnetic gear set, respectively; the magnetic rack and second magnetic gear may magnetically engage in a non-contact state with different first magnetic gear teeth of the first magnetic gear belonging to the same magnetic gear set via the magnetic rack magnetic teeth and the second magnetic gear teeth, respectively; and when the at least one second magnetic gear is used as a driving gear to output power, the power may be transmitted to the magnetic rack through the at least one first magnetic gear so as to move it along the first direction.

The structure of the conveying apparatus effectively suppresses particles such as those generated by mechanical gear transmission. Second, one power source can be used so that a plurality of the first magnetic gears arranged non-coaxially are rotated synchronously; therefore, no additional control member is needed, enhancing the stability of the conveying apparatus and reducing the complexity of the system.

The first axes and the second axes may be arranged differently. For example, the plurality of first axes are arranged substantially in parallel with each other; the plurality of second axes are coaxial and arranged substantially in parallel with the first direction; and the first axes and the second axes are arranged to be substantially perpendicular or inclined to each other; or the plurality of first axes are co-axially arranged; the plurality of second axes are coaxially arranged; and the first axes, the second axes, and the first direction are arranged substantially in parallel with each other.

The use of straight-teeth magnetic racks would cause the movement along the first direction unstable for the reason that they are subject to a force component perpendicular to the first direction. By designing the first magnetic gear and the second magnetic gear as bevel gears and designing the magnetic rack as a bevel rack, the above force component may be reduced, such that the straight-teeth magnetic rack will cause movement along the first direction more stable. As an alternative, the first magnetic gear and the second magnetic gear may be designed as conical gears; moreover, the magnetic rack is designed as a straight rack. By adopting the conical magnetic rack, a force component perpendicular to the first direction may be reduced, such that the straight-teeth magnetic rack will cause movement along the first direction more stable.

According to another aspect of the present invention, there is provided a conveying apparatus, including: a magnetic rack movable along a first direction, having a plurality of magnetic rack magnetic teeth arranged in a first direction, adjacent ones of the magnetic rack magnetic teeth having different polarities; at least one first magnetic gear coaxially arranged, rotatable about at least one first axis, respectively, wherein each magnetic gear has a plurality of first magnetic gear magnetic tooth and adjacent ones of the first magnetic gear magnetic teeth have different polarities; wherein: the first axis and the first direction are arranged substantially in parallel with each other; the plurality of magnetic rack magnetic teeth may engage with the plurality of first magnetic gear magnetic teeth in a non-contact state; and when the at least one first magnetic gear is used as a driving gear to output power, the power may be transmitted to the at least one first magnetic gear via the at least one first magnetic gear so as to move it along the first direction. Based on this solution, the number of magnetic gears can be reduced, costs are reduced, the structure is simplified, and space is saved.

According to another aspect of the present invention, there is provided a transmitting system, including: a first conveying apparatus employing one of the conveying apparatus structures; and a second conveying apparatus employing one of the conveying apparatus structures; wherein a first direction of the first conveying apparatus and a first direction of the second conveying apparatus are substantially parallel with each other; the magnetic rack magnetic teeth of the first conveying apparatus and the magnetic rack magnetic teeth of the second conveying apparatus are arranged in a splayed form. In this way, the magnetic force F applied on the magnetic rack of the first conveying apparatus and the magnetic rack of the second conveying apparatus counteract against each other, and change of a substrate in a direction perpendicular to the first direction is small, and thus a steady gesture can be maintained.

Preferably, the magnetic rack of the first conveying apparatus has a fixed position relative to the magnetic rack of the second conveying apparatus.

Further embodiments and aspects of the present invention are evident from the dependent claims, the description and the accompanying figures.

DETAILED DESCRIPTION OF THE
PREFERRED EMBODIMENTS

Figure 1A:
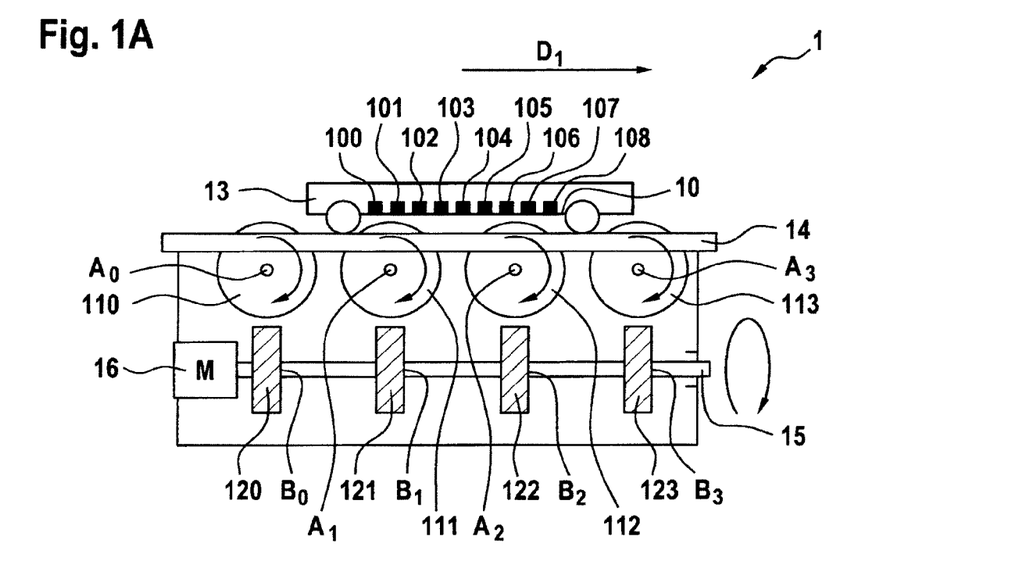
FIGS. 1A and 1B illustrate a main view and a top view of a conveying apparatus according to one embodiment of the present invention.
Figure 1B:
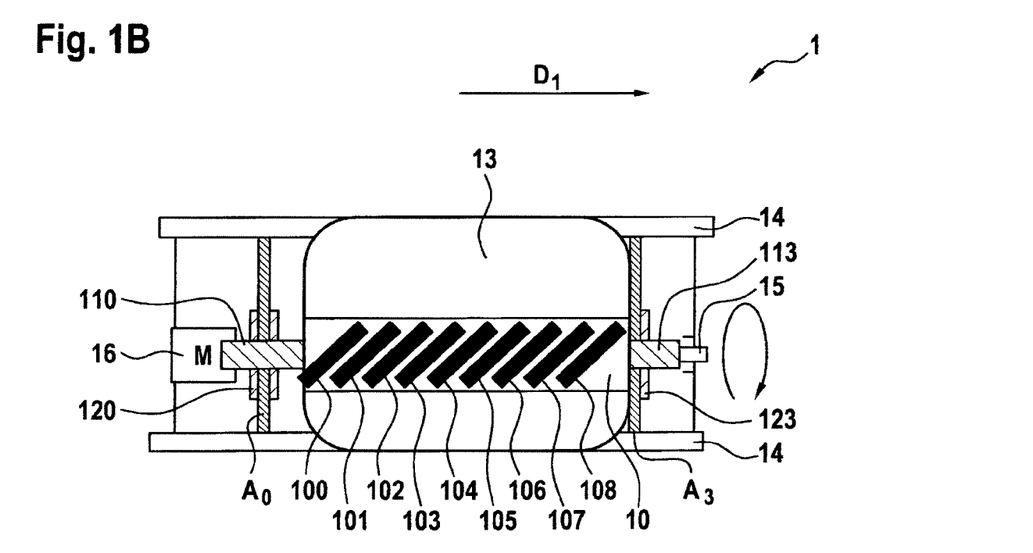

FIGS. 1A and 1B illustrate a main view and a top view of a conveying apparatus according to one embodiment of the present invention. As illustrated in FIGS. 1A and 1B, the conveying apparatus 1 includes: a magnetic rack 10, at least one first magnetic gear 110-113, and at least one second magnetic gear 120-123. The magnetic rack 10 may move along a first direction D1. For example, the magnetic rack 10 may be fixed on the substrate 13 and the substrate 13 is rolling connected to a guide rail 14 arranged in the first direction D1, such that the magnetic rack 10 may move on the guide rail 14 with the substrate 13 along the first direction D1. A to-be-conveyed material is placed on the substrate 13. With the rolling connection, particles generated by contact with the guide rail 14 can be reduced. The magnetic rack 10 further includes a plurality of magnetic rack magnetic teeth 100-108 arranged along the first direction D1, and adjacent ones of the magnetic rack magnetic teeth have different polarities. The substrate 13 may be replaced by a support body, e.g., a longitudinally configured supporting body has two rectangular side faces in a cross-section perpendicular to the travelling direction; with its side faces, the to-be-conveyed material can be supported, respectively. A buckle member is provided in a range of the entire horizontal direction to be slidably connected with the guide rail. The buckle member can have a groove of a curved shape, and can also have a slidable surface only. Therefore, the magnetic rack 10 is capable of moving along the first direction D1 in accordance with the support body.

At one side of the magnetic rack 10 (e.g., below the magnetic rack 10 as illustrated in FIG. 1A), first magnetic gears 110-113 magnetically coupled to the magnetic rack 10 in a contactless state are provided, which may rotate about at least one of first axes A0-A3 and have a plurality of first magnetic gear magnetic teeth (not shown), adjacent ones of the first magnetic gear magnetic teeth having different poles. As illustrated in FIGS. 1A and 1B, the first axes A0-A3 are arranged substantially in parallel with each other; along the path (the first direction D1) that the magnetic rack 10 moves, the first magnetic racks 110-113 are configured with a prescribed spacing. Here, the first magnetic racks 110-113 rotate about an axis parallel with a direction vertical to a travelling direction of the magnetic rack 10. At one side of the first magnetic racks 110-113 (e.g., below the first magnetic racks 110-113 as illustrated in FIGS. 1A and 1B), second magnetic gears 120-123 magnetically coupled to the first magnetic gears 110-113 in a contactless state are provided, which may rotate about at least one of second axes B0-B3, respectively, and have a plurality of second magnetic gear magnetic teeth (not shown), adjacent ones of the second magnetic gear magnetic teeth having different polarities. As illustrated in FIGS. 1A and 1B, the second axes B0-B3 are coaxial and parallel with the path that the magnetic rack 10 move (i.e., the first direction D1); along the path that the magnetic rack 10 move (the first direction D1), the second magnetic racks 120-123 are configured with a prescribed spacing. Here, the second magnetic gears 120-123 may be mechanically connected through a rotational axis 15.

As illustrated in FIGS. 1A and 1B, the rotational axis 15 is fixedly and mechanically connected to a rotational axis of the electric motor 16, such that it can rotate with rotation of the electric motor 16. When the second magnetic gears 120-123 are used as driving wheels to output power, the power may be transmitted by the first magnetic gears 110-113 to the magnetic rack 10 so as to move it along the first direction D1. Driven by the magnetic rack 10, the substrate 13 can move along the track 14, thereby completing delivery of the material. By constructing the first magnetic gears 110-113 and the second magnetic gears 120-123 in a contactless state, rotation of the second magnetic gears 120-123 is translated into rotation of the first magnetic gears 110-113 and then translated into straight-line movement of the magnetic rack 10. This effectively suppresses particles such as those generated by mechanical gear transmission. In addition, in order to rotate the separately arranged magnetic gears, electric motors may also be separately provided, and a controlling member that synchronizes respective electric motors may also be provided. Second, one power source may be used to synchronously rotate a plurality of non-coaxially arranged first magnetic gears; therefore, no additional control member is needed, such that not only the stability of the conveying apparatus is enhanced, the complexity of the system is reduced.

Figure 2A:
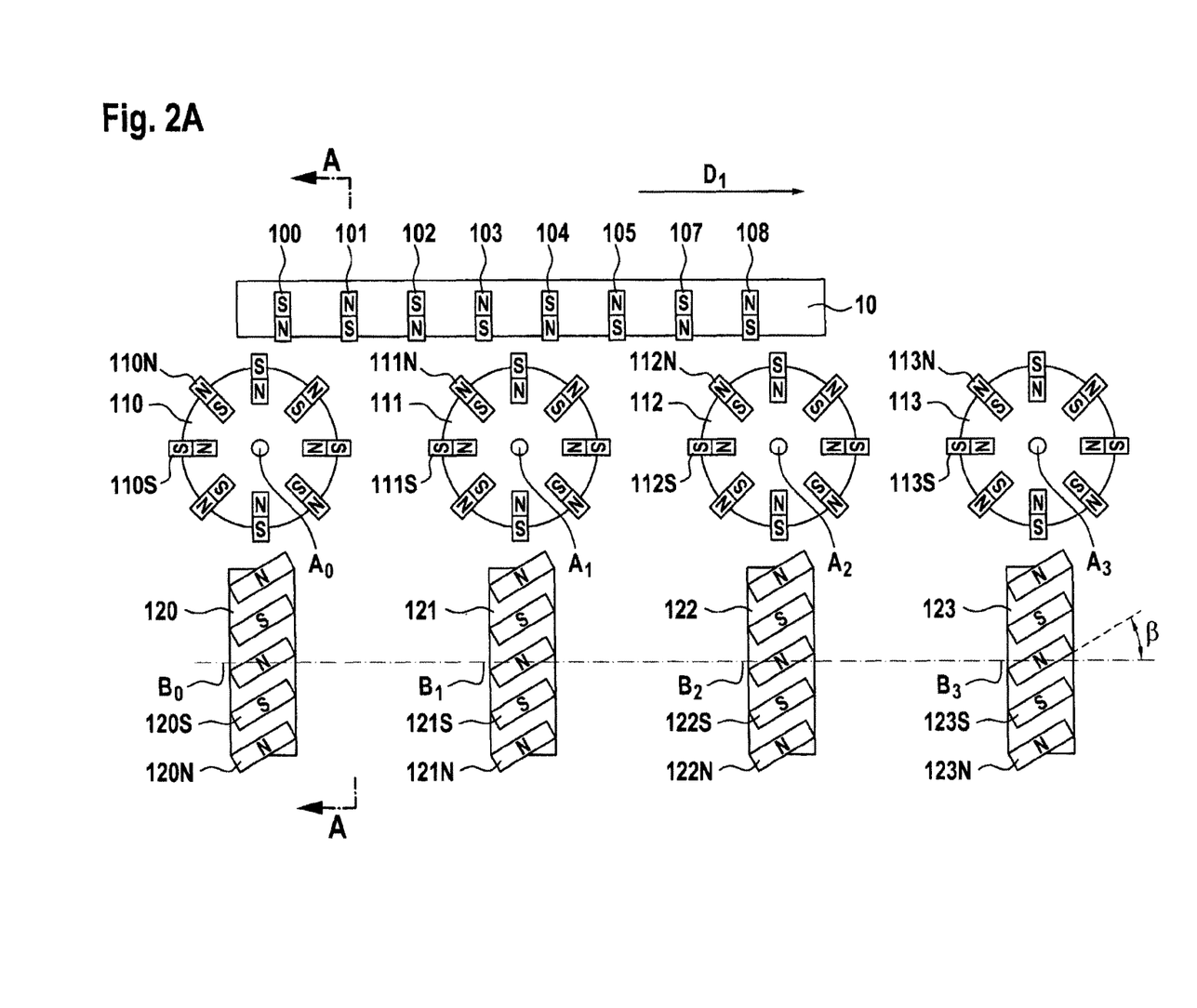
FIGS. 2A and 2B illustrate a side view of a magnetic rack, a first magnetic rack, and a second magnetic rack according to the embodiment of FIGS. 1A and 1B, and a sectional view thereof along a sectional line A, respectively.
Figure 2B:
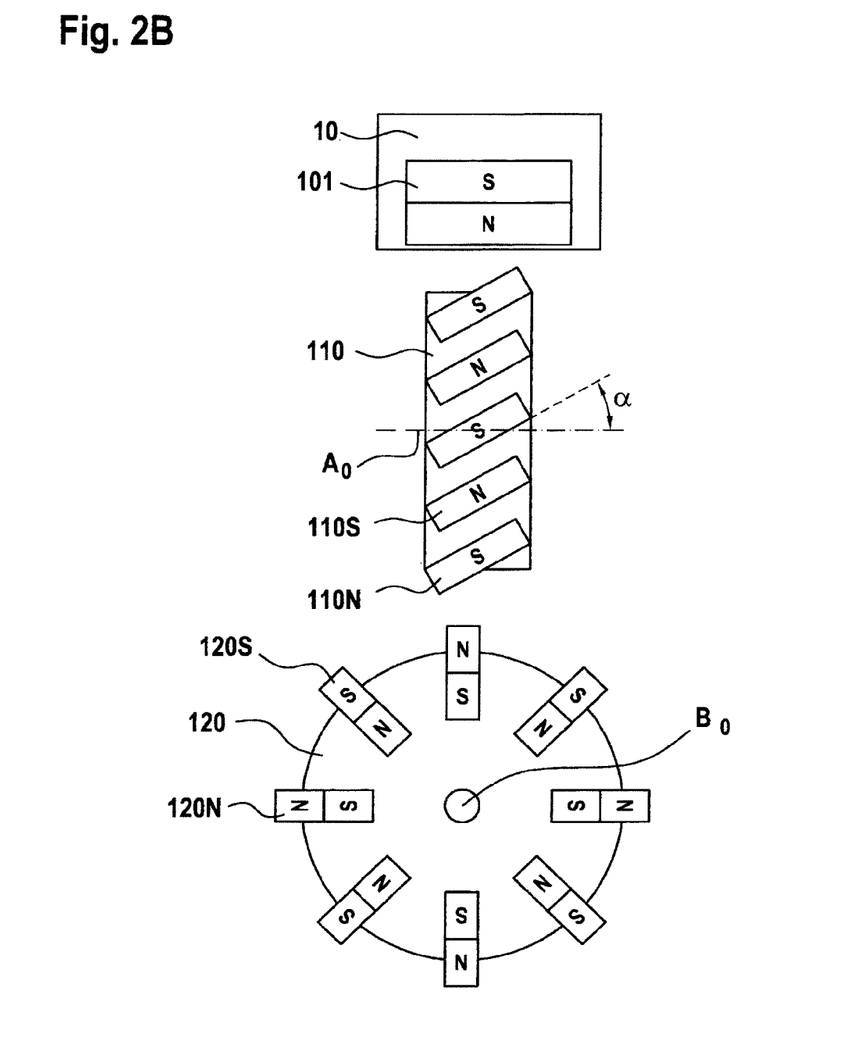

FIGS. 2A and 2B illustrate a side view of a magnetic rack, a first magnetic rack, and a second magnetic rack according to the embodiment of FIGS. 1A and 1B, and a sectional view thereof along a sectional line A, respectively. As illustrated in FIGS. 2A and 2B, in the path along which the magnetic racks 10 move (the first direction D1), the magnetic rack magnetic teeth 100-108 are configured with a prescribed spacing, and adjacent ones of the magnetic rack magnetic teeth 100-108 facing the first magnetic gears 110-113 exhibit different polarities, i.e., S pole or N pole. The magnetic rack magnetic teeth 100-108 may be straight teeth, i.e., provided perpendicular to the path along which the magnetic racks 10 move (first direction D1).

In addition, the first magnetic gears 110-113 that are rotatable include first axes A0-A3 and a plurality of first magnetic gear magnetic teeth which are arranged alternately and present N pole and S pole to the outside. The plurality of first magnetic gear magnetic teeth have a same shape and are arranged with a same spacing for the first magnetic gear magnetic teeth. For example, the first magnetic gear 110 includes first magnetic gear magnetic teeth 110N, 110S, 110N, 110S . . . ; the first magnetic gear 111 includes first magnetic gear magnetic teeth 111N, 111S, 111N, 111S . . . ; the first magnetic gear 112 includes first magnetic gear magnetic teeth 112N, 112S, 112N, 112S . . . ; and the first magnetic gear 113 includes first magnetic gear magnetic teeth 113N, 113S, 113N, 113S . . . . Similarly, the rotatable second magnetic gears 120-123 contain second axes B0-B3 and a plurality of second magnetic gear magnetic teeth which are alternately arranged and present N pole and S pole to the outside. The plurality of second magnetic gear magnetic teeth have a same shape and are arranged with a same spacing for the second magnetic gear magnetic teeth. For example, the second magnetic gears 120 includes second magnetic gear magnetic teeth 120N, 120S, 120N, 120S . . . ; the second magnetic gear magnetic teeth 121 includes second magnetic gear magnetic teeth 121N, 121S, 121N, 121S . . . ; the second magnetic gear 122 includes second magnetic gear magnetic teeth 122N, 122S, 122N, 122S . . . ; and the third magnetic gear 123 includes second magnetic gear magnetic teeth 123N, 123S, 123N, 123S . . . . As illustrated in FIGS. 2A and 2B, the first magnetic gears 110-113 and the second magnetic gears 120-123 may be bevel gears, namely, a first angle α exists between the first magnetic gear magnetic teach and the first axis, and a second angle β exists between the second magnetic gear magnetic teeth and the second axis. It is most preferable that a straight-line spacing between the magnetic rack magnetic teeth=spacing of arc length of the first magnetic gear=spacing of arc length of the second magnetic gear, and the first angle α+the second angle β=90°. As illustrated in FIGS. 2A and 2B, the first magnetic gears 110-113 form magnetic gear sets with the second magnetic gears 120-123, respectively, with magnetic engagement therebetween in a contactless manner. With the first magnetic gear 110 and the second magnetic gear 120 as an example, the magnetic rack 13 and the second magnetic gear 120 are magnetically engaged with different first magnetic gear magnetic teeth 110N, 110S of the first magnetic gear 110 belonging to the same magnetic gear set, for example, through the magnetic rack magnetic tooth 130 (e.g., presenting S pole wire respect to the first magnetic gear) and the second magnetic gear magnetic tooth 120N. With rotation of the first magnetic gears 110-113 and the second magnetic gears 120-123, the magnetic rack 13 and the second magnetic gear 120 are magnetically engaged with different first magnetic gear magnetic teeth 110S, 110N of the first magnetic gear 110 belonging to the same magnetic gear set, for example, through the magnetic rack magnetic tooth 131 (e.g., presenting N pole with respect to the first magnetic gear) and the second magnetic gear magnetic tooth 120S, wherein the magnetic rack magnetic tooth 130 in a contactless state, different first magnetic gear magnetic teeth 110N, 110S, and the second magnetic gear magnetic tooth 120N of the first magnetic gear 110 are marked with slanted lines. Therefore, when the driving wheel, i.e., the second magnetic gear 120, rotates, its second magnetic gear tooth 120N applies a traction force to the first magnetic gear magnetic tooth 110S to drive the second magnetic gear 120 to rotate; further, when the first magnetic gear 110 rotates, its first magnetic gear magnetic tooth 110S applies a traction force to the magnetic rack magnetic tooth 130(N) along a first direction D1, thereby driving the magnetic rack 130 to move along the first direction. A pull force is applied to the magnetic rack 13, and meanwhile particles will not be generated from the contactless engagement. Based on the same rationales, the first magnetic gears 111-113 and the second magnetic gears 121-123 belonging to other magnetic gear sets may also apply a push force to the magnetic rack 13.

Figure 3A:
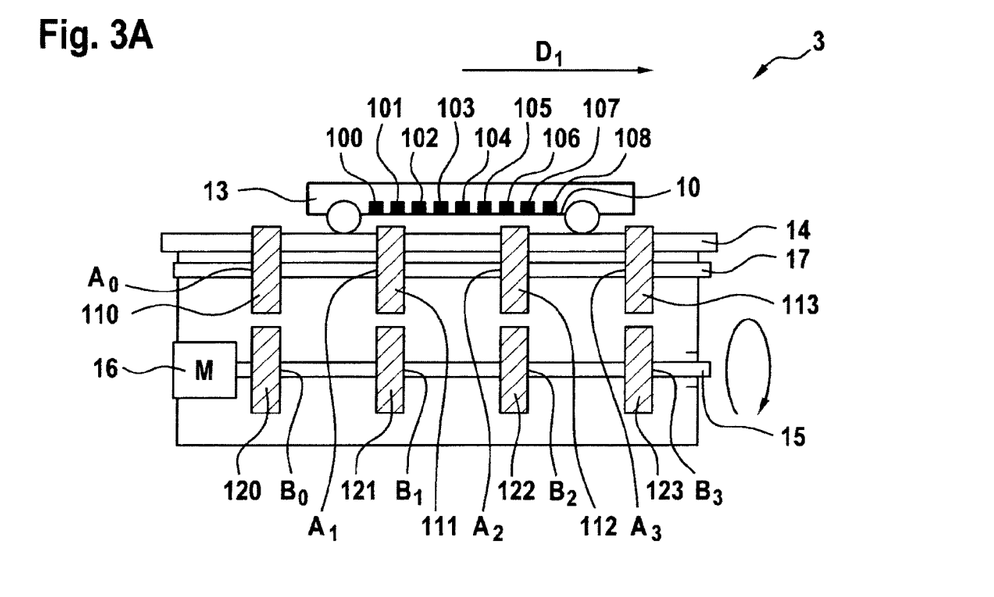
FIGS. 3A and 3B illustrate a conveying apparatus according to another embodiment of the present invention.
Figure 3B:
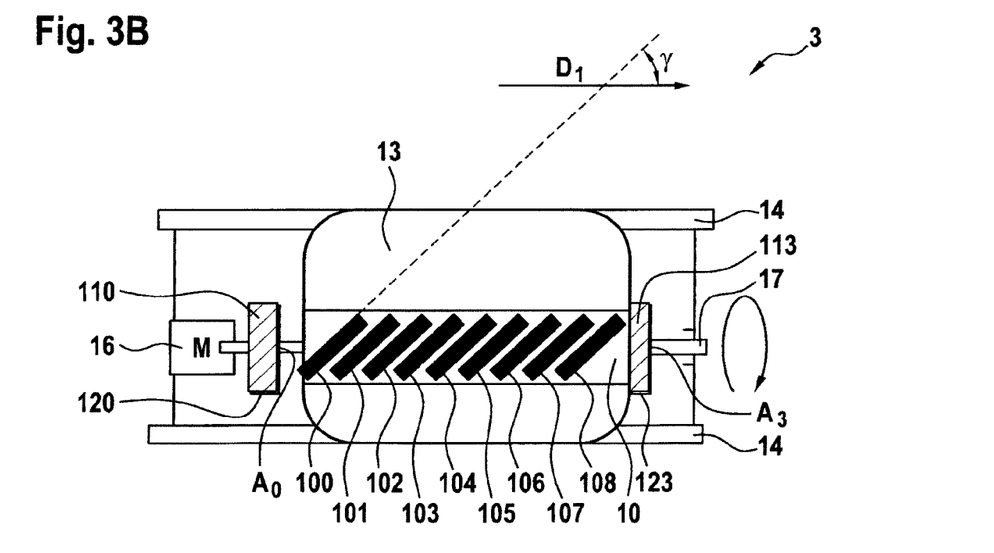

FIGS. 3A and 3B illustrate a conveying apparatus according to another embodiment of the present invention. For the sake of brevity, components and structures identical to those of the conveying apparatus as illustrated in FIGS. 1A and 1B will not be detailed. Different from the conveying apparatus illustrated in FIGS. 1A and 1B, in the conveying apparatus 3 as illustrated in FIGS. 3A and 3B, the first axes A0-A3 of the first magnetic gears 110-112 are co-axially arranged and move in the path along which the magnetic rack 10 moves (the first direction D1). For example, the first magnetic gears 110-113 may be mechanically connected through the rotation axis 17. Along the path that the magnetic rack 10 moves (the first direction D0, the first magnetic gears 110-113 are configured with a prescribed spacing. The first axes A0-A3 and the second axes B0-B3 are parallel with the first direction D1, respectively.

Figure 4A:
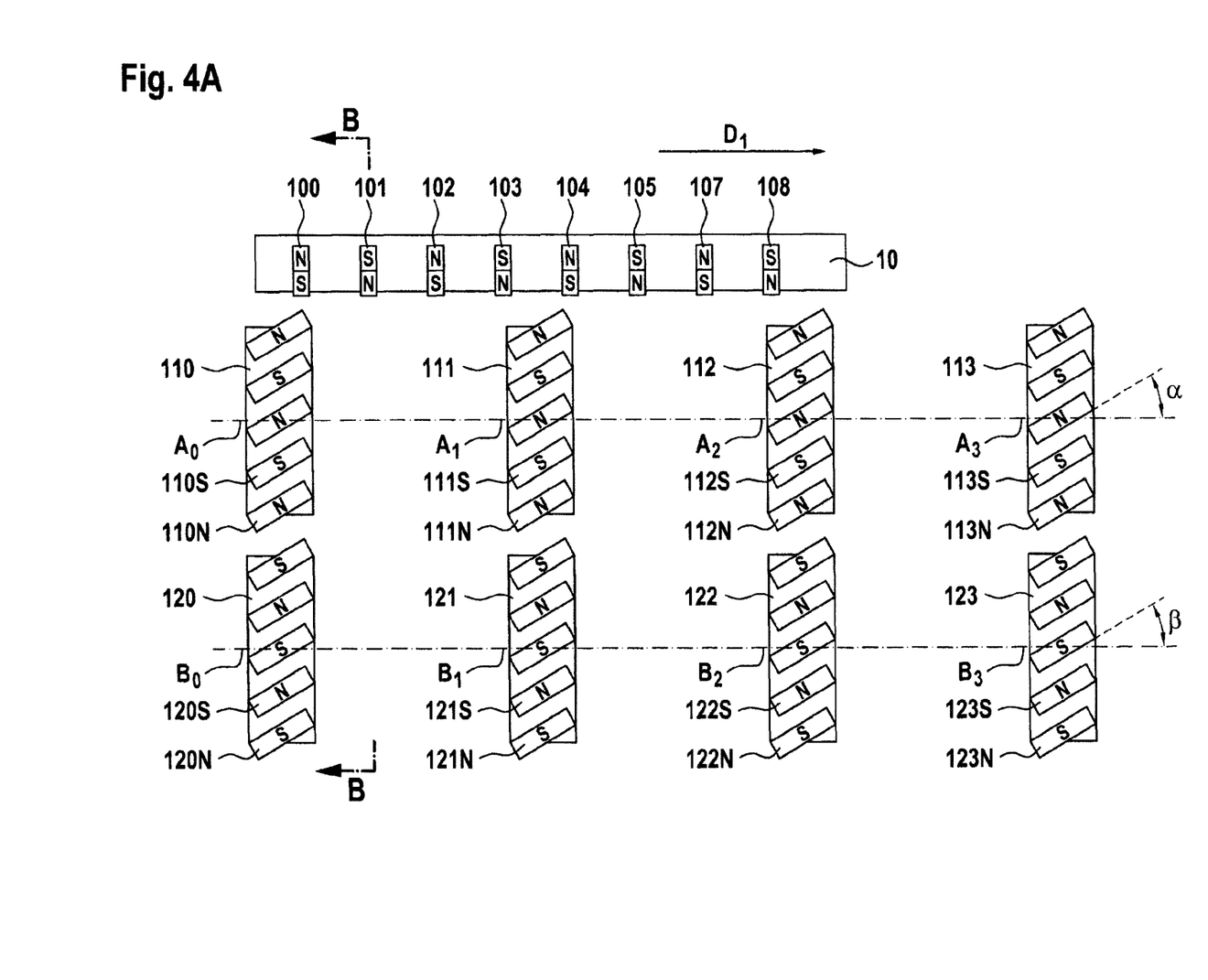
FIGS. 4A and 4B illustrate a side view of a magnetic rack, a first magnetic rack, and a second magnetic rack according to the embodiment of FIGS. 3A and 3B, and a sectional view thereof along a sectional line B, respectively.
Figure 4B:
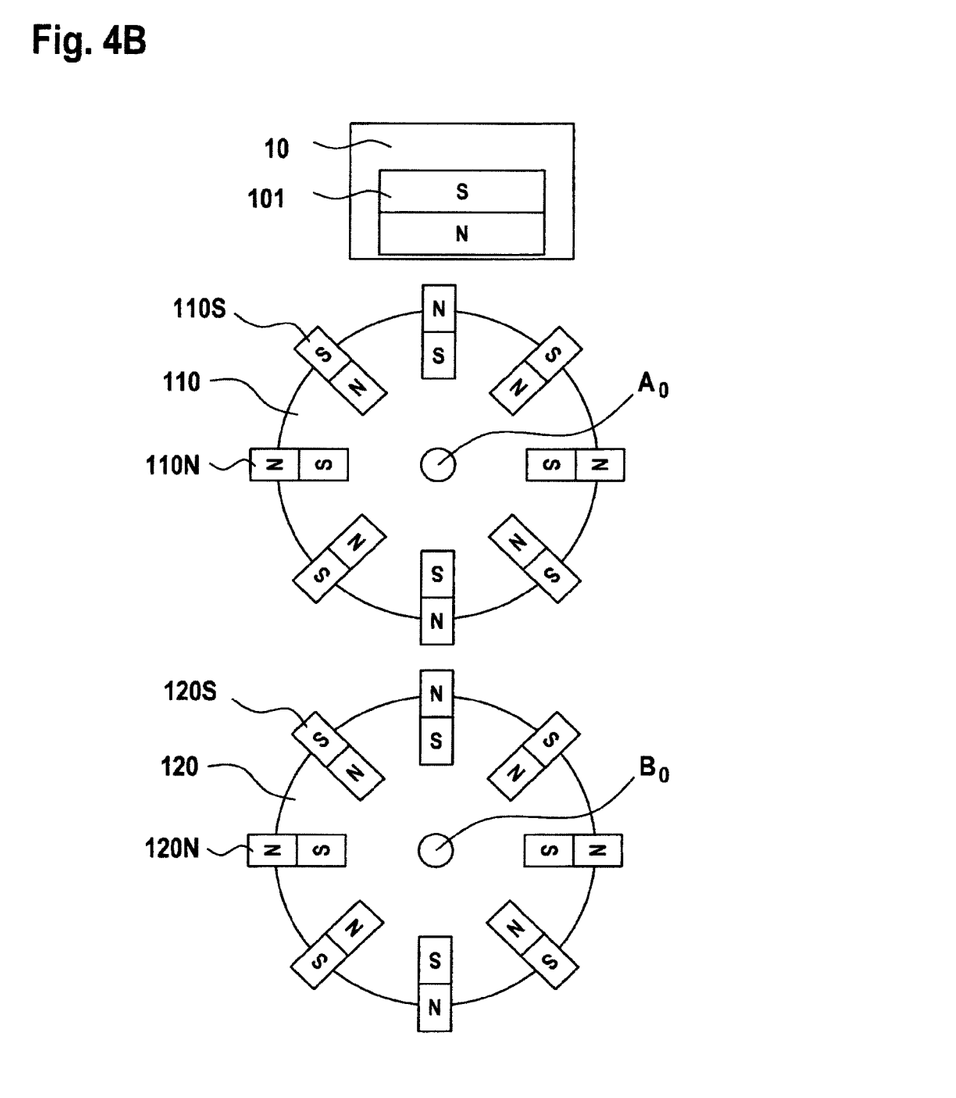

FIGS. 4A and 4B illustrate a side view of a magnetic rack, a first magnetic rack, and a second magnetic rack according to the embodiment of FIGS. 3A and 3B, and a sectional view thereof along a sectional line B, respectively. Different from FIGS. 2A and 2B, as illustrated in FIGS. 4A and 4B, most preferably, a straight-line spacing between the magnetic rack magnetic teeth=spacing of arc length of the first magnetic gear=spacing of arc length of the second magnetic gear, and the first angle α=the second angle β.

The use of the straight-tooth magnetic rack would cause movement along the first direction unstable, because it is subject to a force component perpendicular to the first direction. As a variant to the embodiment above, the magnetic rack magnetic teeth 100-108 may be bevel teeth. As a variant to the embodiments of the present invention, the magnetic teeth 100-108 of FIGS. 2A and 2B may be set to have a third angle γ with respect to the path (the first direction D1) along which the magnetic rack 10 moves, most preferably the first angle α=the third angle γ. In this way, the force component above may be reduced such that the straight-tooth magnetic rack causes the movement along the first direction more steady.

Figure 5A:
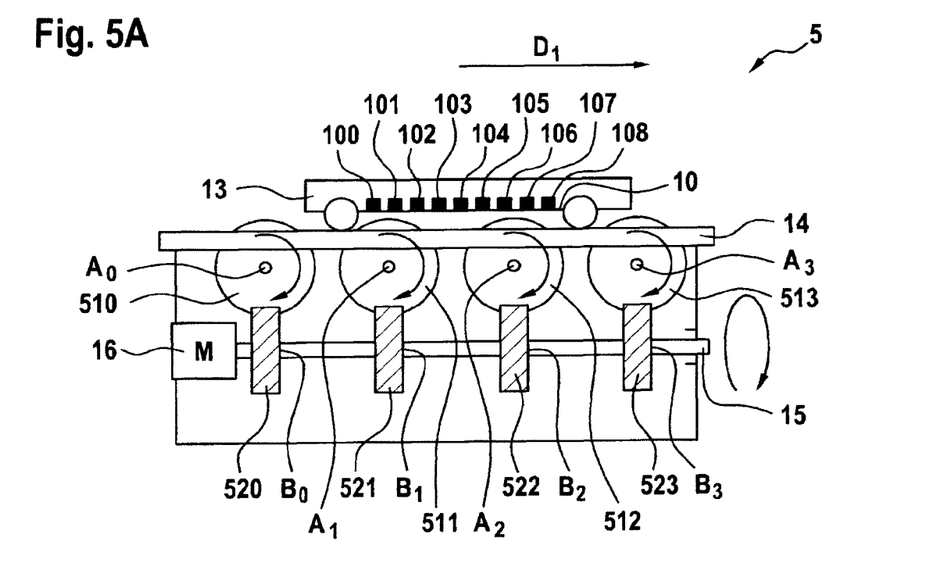
FIGS. 5A and 5B illustrate a conveying apparatus according to a further embodiment of the present invention.
Figure 5B:
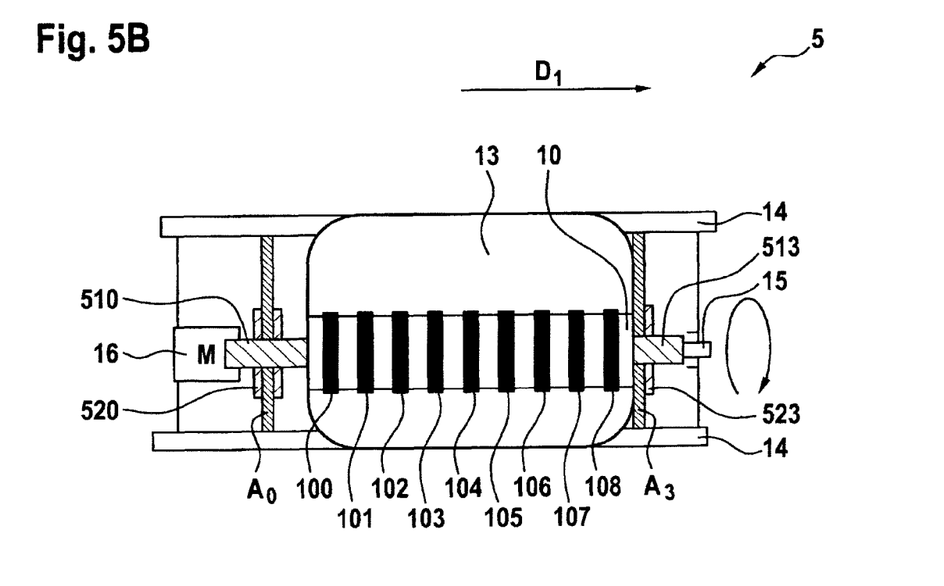

FIGS. 5A and 5B illustrate a conveying apparatus according to a further embodiment of the present invention. For the sake of brevity, components and structures identical to those of the conveying apparatus as illustrated in FIGS. 1A and 1B will not be detailed. Different from the conveying apparatus illustrated in FIGS. 1A and 1B, in the conveying apparatus 5 as illustrated in FIGS. 5A and 5B, the first magnetic gears 510-513 and the second magnetic gears 520-530 in the same magnetic gear set are conical magnetic gear sets.

Figure 6A:
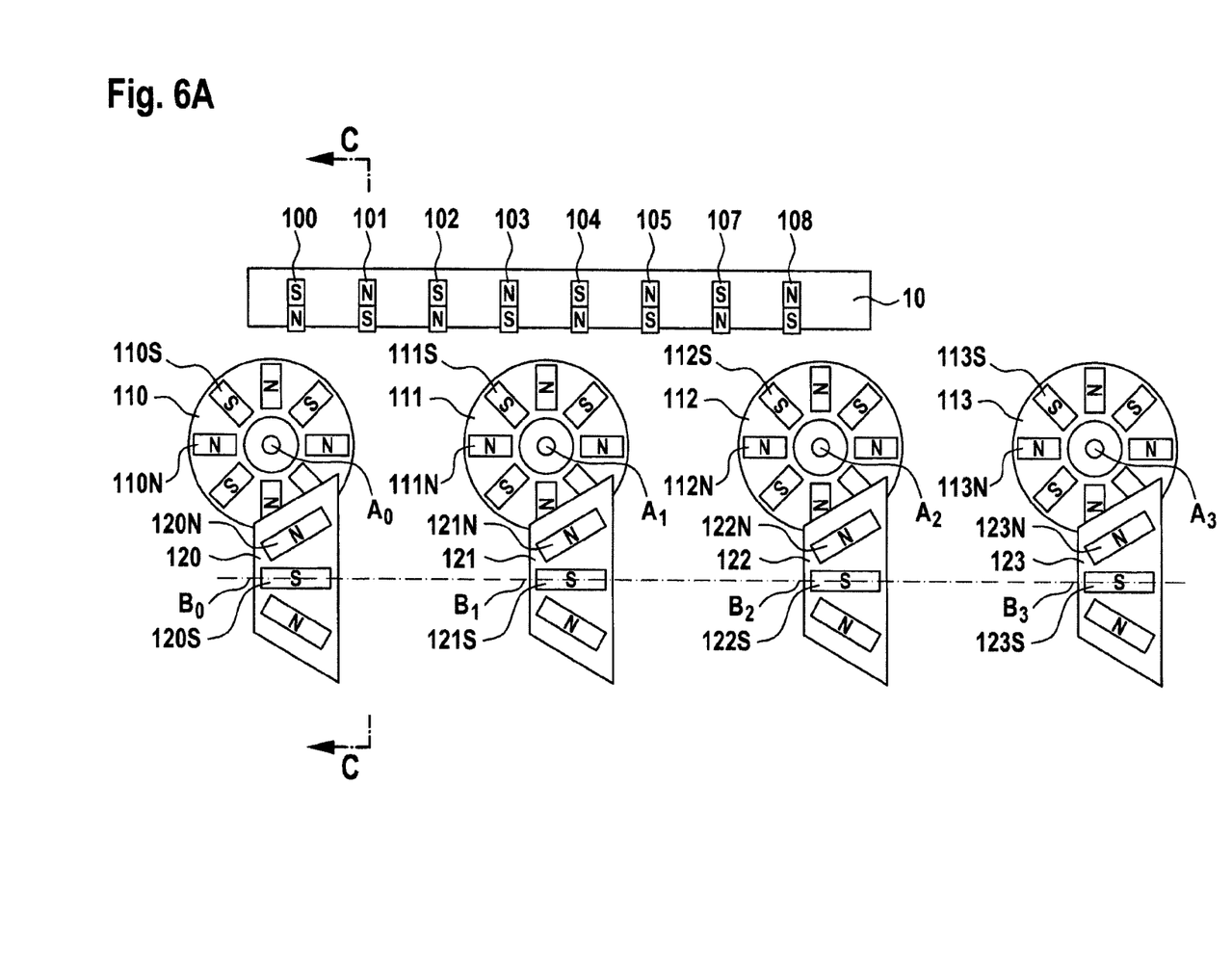
FIGS. 6A and 6B illustrate a side view of a magnetic rack, a first magnetic rack, and a second magnetic rack according to the embodiment of FIGS. 5A and 5B, and a sectional view thereof along a sectional line C, respectively.
Figure 6B:
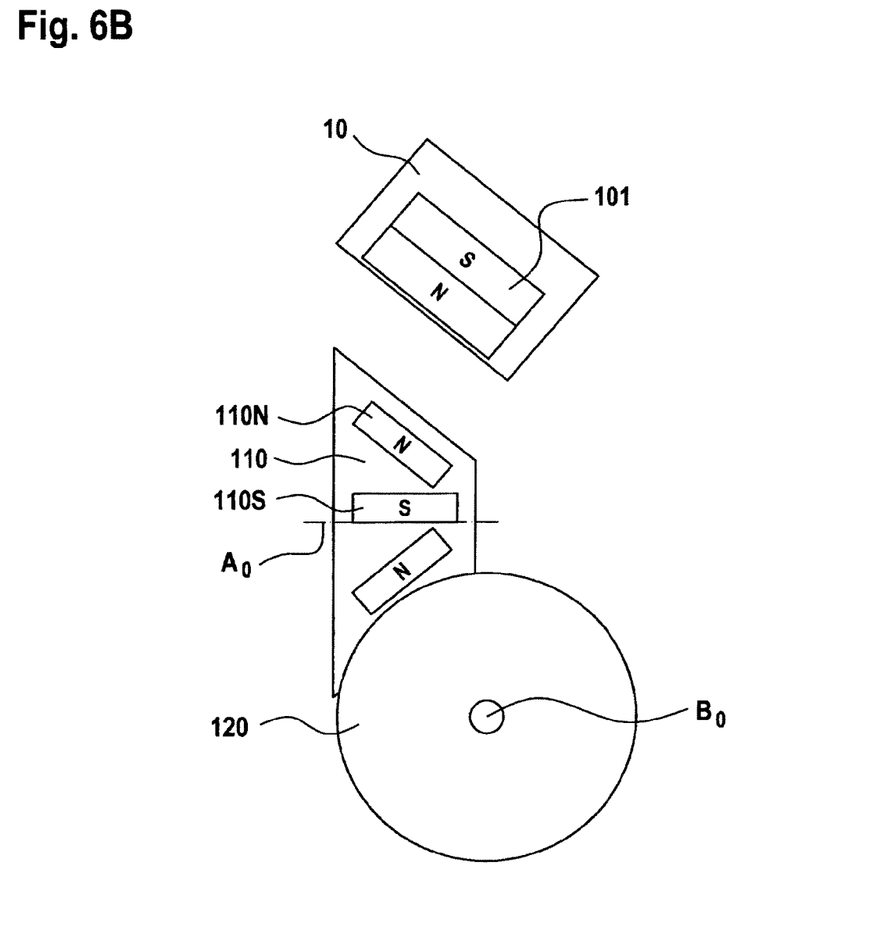

FIGS. 6A and 6B illustrate a side view of a magnetic rack, a first magnetic rack, and a second magnetic rack according to the embodiment of FIGS. 5A and 5B, and a sectional view thereof along a sectional line C, respectively. Different from FIGS. 1A and 1B, as illustrated in FIGS. 6A and 6B, the shapes of the first magnetic gears 510-513 and the second magnetic gears 520-523 are substantially in a conical shape. A plurality of magnetic teeth are arranged about the conical magnetic gear. These magnetic teeth are positioned on skirted main conical faces. For example, the first magnetic gear 510 includes first magnetic gear magnetic teeth 510N, 510S, 510N, 510S . . . ; the first magnetic gear 511 includes first magnetic gear magnetic teeth 511N, 511S, 511N, 511S . . . ; the first magnetic gear 512 includes first magnetic gear magnetic teeth 512N, 512S, 512N, 512S . . . ; and the first magnetic gear 513 includes first magnetic gear magnetic teeth 513N, 513S, 513N, 513S . . . . Similarly, rotatable second magnetic gears 520-523 include second axes B0-B3 and a plurality of second magnetic gear magnetic teeth alternately arranged and presenting N pole and S pole to the outside. The plurality of second magnetic gear magnetic teeth have a same shape and are arranged with a same spacing for the second magnetic gear magnetic teeth. For example, the second magnetic gear 520 includes second magnetic gear magnetic teeth 520N, 520S, 520N, 520S . . . ; the second magnetic gear 521 includes second magnetic gear magnetic teeth 521N, 521S, 521N, 521S . . . ; the second magnetic gear 522 includes second magnetic gear magnetic teeth 522N, 522S, 522N, 522S . . . ; and the second magnetic gear 523 includes second magnetic gear magnetic teeth 523N, 523S, 523N, 523S . . . . These magnetic teeth are arranged to extend towards the base from an assumptive apex of the conical head. During use, the corresponding magnetic teeth 510-513 and the second magnetic teeth 520-523 are driven to rotate, such that neighboring skirted main conical faces move to each other closely. In the embodiments as illustrated, the magnetic teeth of the first magnetic gear are all positioned such that the polarity of the outer surface of each magnetic tooth (i.e., positioned at the surface at the utmost outer periphery of the end head) matches the polarity of the surface of a corresponding magnetic tooth positioned at the second magnetic gear in the same magnetic set. Therefore, due to the attractive magnetic force between corresponding magnets on neighboring magnetic teeth, rotation of the second axis drives the first axis to rotate, and vice versa. Most preferably, the magnetic rack 10 is arranged to rotate by an angle about the first direction D1, such that the magnetic teeth of the first magnetic gear engaged in a contactless state and the magnetic teeth of the magnetic rack may be substantially parallel. By using conical magnetic gears, the force component above may be reduced, such that the straight-tooth magnetic rack will cause movement along the first direction more stable.

Figure 7A:
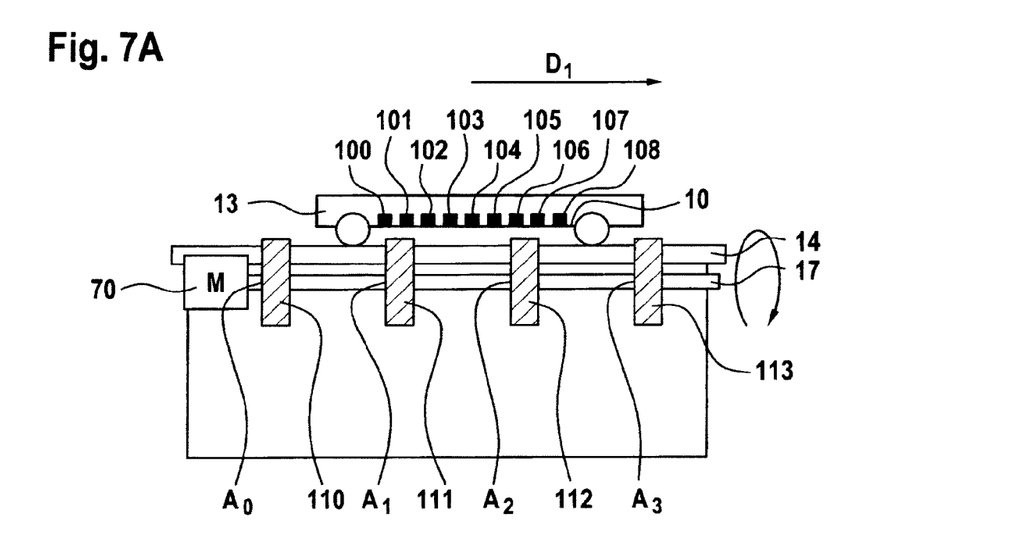
FIGS. 7A and 7B illustrate a conveying apparatus according to a still further embodiment of the present invention.
Figure 7B:
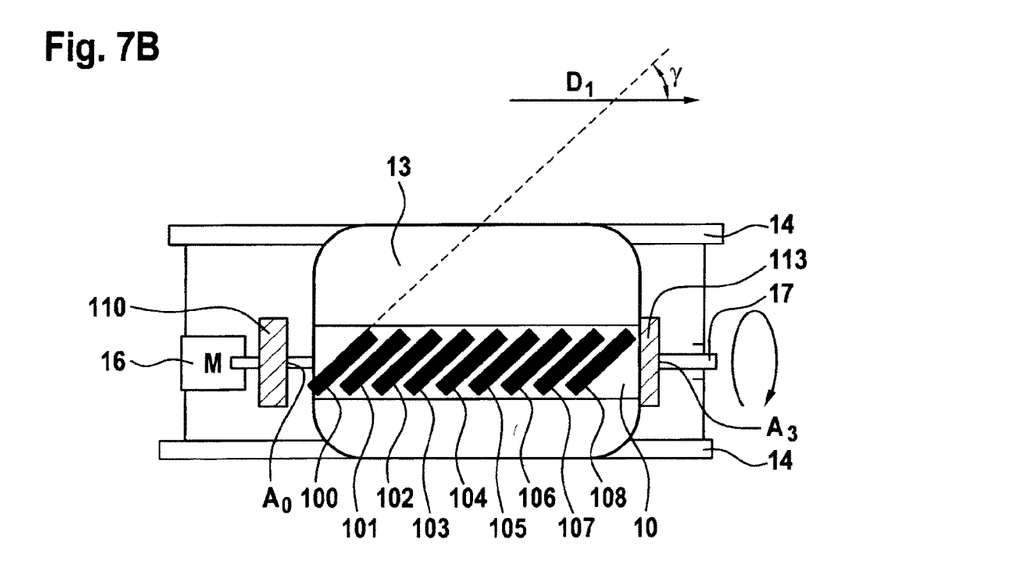

FIGS. 7A and 7B illustrate a conveying apparatus according to a still further embodiment of the present invention. For the sake of brevity, components and structures identical to those of the conveying apparatus as illustrated in FIGS. 3A and 3B will not be detailed. Different from the conveying apparatus illustrated in FIGS. 3A and 3B, the conveying apparatus 7 as illustrated in FIGS. 7A and 7B do not include the second magnetic gears 120-123. A rotational axis 17 is fixedly mechanically connected to a rotational axis of the electrical motor 70, so as to rotate in accordance with rotation of the electrical motor 70. When the first magnetic gears 110-113 are used as driving wheels to output power, the power may be transmitted to the magnetic rack 10 through the first magnetic gears 110-113 so as to move the magnetic rack 10 along the first direction D1. In this way, the number of magnetic gears can be reduced, the costs are lowered, the structure is simplified, and the space is saved.

Figure 8:
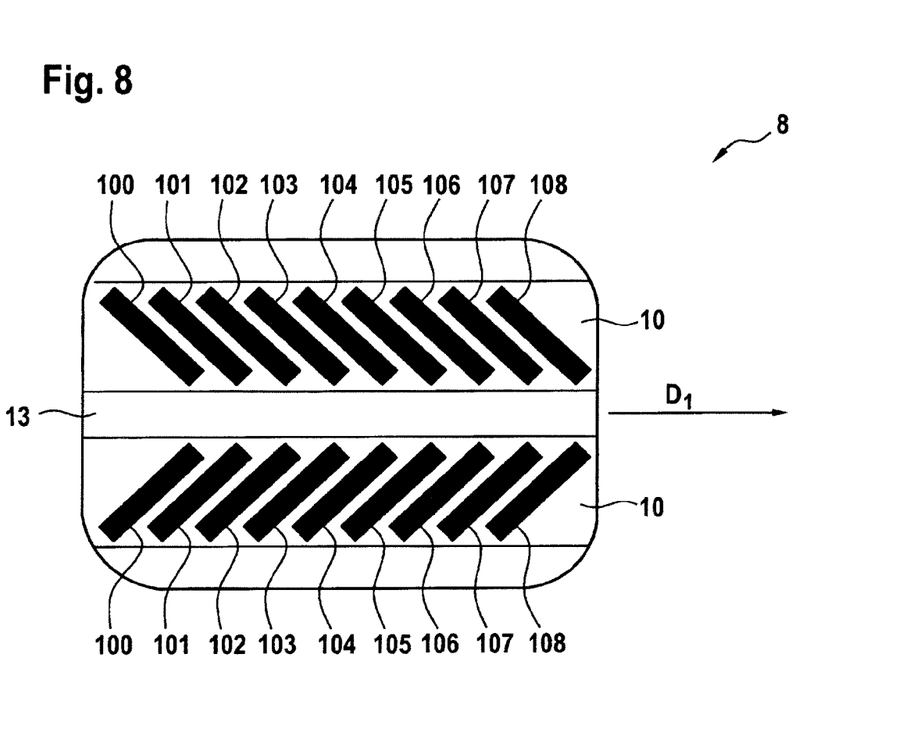
FIG. 8 illustrates a transmitting system according to one embodiment of the present invention.

The first magnetic gears in the conveying apparatuses illustrated in FIGS. 1A and 1B and in FIGS. 3A and 3B are bevel gears or conical gears, the magnetic coupling between the magnetic gear magnetic teeth and the first magnetic gear magnetic teeth will apply a force component F perpendicular to the first direction D1 to the magnetic rack. This will bring an advantageous effect on the stability of material conveying. FIG. 8 illustrates a transmitting system of another embodiment of the present invention. As illustrated in FIG. 8, the transmitting system 8 may include a first conveying apparatus 3 according to FIGS. 3A and 3B and a second conveying apparatus 3 according to FIGS. 3A and 3B. As a variant, the transmitting system according to the present invention may also include a pair of conveying apparatuses 1 according to FIGS. 1A and 1B, a pair of conveying apparatuses 5 according to FIGS. 5A and 5B, a pair of conveying apparatuses 7 according to FIGS. 7A and 7B, a combination of conveying apparatus 1 according to FIGS. 1A and 1B and conveying apparatus 3 according to FIGS. 3A and 3B, a combination of conveying apparatus 1 according to FIGS. 1A and 1B and conveying apparatus 5 according to FIGS. 5A and 5B, a combination of conveying apparatus 1 according to FIGS. 1A and 1B and conveying apparatus 7 according to FIGS. 7A and 7B, a combination of conveying apparatus 3 according to FIGS. 3A and 3B and conveying apparatus 5 according to FIGS. 5A and 5B, a combination of conveying apparatus 3 according to FIGS. 3A and 3B and conveying apparatus 7 according to FIGS. 7A and 7B, a combination of conveying apparatus 5 according to FIGS. 5A and 5B and conveying apparatus 7 according to FIGS. 7A and 7B. As illustrated in FIG. 8, the first direction D1 of the first conveying apparatus 3 and the first direction D1 of the second conveying apparatus 3 are substantially parallel; and the magnetic rack magnetic teeth 100-108 of the first conveying apparatus 3 and the magnetic rack magnetic teeth 100-108 of the second conveying apparatus 3 are arranged in a scalloped form; besides, the magnetic teeth 10 of the first conveying apparatus 3 and the magnetic teeth 10 of the second conveying apparatus 3 have a fixed relative position, e.g., fixed at two sides of the substrate 13.

In this way, the magnetic force F applied on the magnetic rack 10 of the first conveying apparatus 3 and the magnetic rack 10 of the second conveying apparatus 3 counteract against each other, and change of the substrate 13 in a direction perpendicular to the first direction is small; therefore, a steady gesture can be maintained.

Although the present invention has been illustrated and described with reference to some preferred embodiments of the present invention, those skilled in the art should understand that various changes may be made in formality and details without departing from the spirit and scope of the present invention as limited in the appended claims.

We claim:

1. A conveying apparatus, comprising:
   a magnetic rack movable along a first direction, having a plurality of magnetic rack magnetic teeth arranged in the first direction, adjacent ones of the magnetic rack magnetic teeth having different polarities;
   at least one first magnetic gear rotatable about at least one first axis, respectively, wherein each first magnetic gear has a plurality of first magnetic gear magnetic teeth and adjacent ones of the first magnetic gear magnetic teeth have different polarities;
   at least one second magnetic gear rotatable about at least one second axis, respectively, wherein each second magnetic gear has a plurality of second magnetic gear magnetic teeth and adjacent ones of the second magnetic gear magnetic teeth have different polarities;
   wherein:
   the at least one first magnetic gear, in combination with the at least one second magnetic gear, forms at least one magnetic gear set, respectively;
   the magnetic rack and the second magnetic gear are capable of magnetically engaging in a non-contact state with different first magnetic gear teeth of the first magnetic gear belonging to the same magnetic gear set via the magnetic rack magnetic teeth and the second magnetic gear teeth respectively; and in case that the at least one second magnetic gear is used as a driving gear to output power, the power is transmittable to the magnetic rack through the at least one first magnetic gear so as to move it along the first direction.

2. The conveying apparatus according to claim 1, wherein:

the at least one magnetic gear rotatable about at least one first axis;

the at least one second magnetic gear rotatable about at least one second axis;

in case the at least one magnetic gear includes a plurality of magnetic gears, the plurality of first axes associated with the plurality of magnetic gears are arranged substantially in parallel with each other;

in case the at least one second magnetic gear includes a plurality of second magnetic gears, the plurality of second axes are coaxial and arranged substantially in parallel with the first direction; and the first axes and the second axes are arranged to be substantially perpendicular or inclined to each other.

3. The conveying apparatus according to claim 1, wherein:

the at least one magnetic gear rotatable about at least one first axis;

the at least one second magnetic gear rotatable about at least one second axis;

in case the at least one magnetic gear includes a plurality of magnetic gears, the plurality of first axes are co-axially arranged;

in case the at least one second magnetic gear includes a plurality of second magnetic gears, the plurality of second axes are co-axially arranged; and the first axes, the second axes, and the first direction are arranged substantially in parallel with each other.

4. The conveying apparatus according to claim 1, wherein:

the first magnetic gears and the second magnetic gears are bevel gears; and the magnetic rack is a bevel rack.

5. The conveying apparatus according to claim 1, wherein:

the first magnetic gear and the second magnetic gear are conical gears; and the magnetic rack is a straight rack.

6. The conveying apparatus according to claim 2, wherein the first magnetic gears and the second magnetic gears are bevel gears; and wherein the magnetic rack is a bevel rack.

7. The conveying apparatus according to claim 3, wherein the first magnetic gears and the second magnetic gears are bevel gears; and wherein the magnetic rack is a bevel rack.

8. The conveying apparatus according claim 2, wherein the first magnetic gear and the second magnetic gear are conical gears; and wherein the magnetic rack is a straight rack.

9. The conveying apparatus according claim 3, wherein the first magnetic gear and the second magnetic gear are conical gears; and wherein the magnetic rack is a straight rack.

10. A conveying apparatus, comprising:

a magnetic rack movable along a first direction, having a plurality of magnetic rack magnetic teeth arranged in the first direction, adjacent ones of the magnetic rack magnetic teeth having different polarities;

at least one first magnetic gear arranged coaxially, being rotatable about a first axis, and wherein each first magnetic gear has a plurality of first magnetic gear magnetic teeth and adjacent ones of the first magnetic gear magnetic teeth have different polarities, wherein the at least one first magnetic gear is a gear wheel;

wherein:

the first axis and the first direction are arranged substantially in parallel with each other;

the plurality of magnetic rack magnetic teeth are capable of engaging with the plurality of first magnetic gear magnetic teeth in a non-contact state; and in case that the at least one first magnetic gear are used as a driving gear to output power, the power is transmittable to the plurality of magnetic rack magnetic teeth via the at least one first magnetic gear so as to move the magnetic rack along the first direction.

11. The conveying apparatus according to claim 10, wherein:

the first magnetic gear is a bevel gear; and the magnetic rack is a bevel rack.

12. The conveying apparatus according to claim 10, wherein:

the first magnetic gear is a conical gear; and the magnetic rack is a straight rack.

13. A transmitting system, comprising:

a first conveying apparatus comprising:

a magnetic rack movable along a first direction, having a plurality of magnetic rack magnetic teeth arranged in the first direction, adjacent ones of the magnetic rack magnetic teeth having different polarities;

at least one first magnetic gear rotatable about at least one first axis, respectively, wherein each first magnetic gear has a plurality of first magnetic gear magnetic teeth and adjacent ones of the first magnetic gear magnetic teeth have different polarities;

at least one second magnetic gear rotatable about at least one second axis, respectively, wherein each second magnetic gear has a plurality of second magnetic gear magnetic teeth and adjacent ones of the second magnetic gear magnetic teeth have different polarities;

wherein:

the at least one first magnetic gear, in combination with the at least one second magnetic gear, forms at least one magnetic gear set, respectively;

the magnetic rack and the second magnetic gear are capable of magnetically engaging in a non-contact state with different first magnetic gear teeth of the first magnetic gear belonging to the same magnetic gear set via the magnetic rack magnetic teeth and the second magnetic gear teeth respectively; and in case that the at least one second magnetic gear is used as a driving gear to output power, the power is transmittable to the magnetic rack through the at least one first magnetic gear so as to move it along the first direction;

a second conveying apparatus comprising:

a magnetic rack movable along a first direction, having a plurality of magnetic rack magnetic teeth arranged in the first direction, adjacent ones of the magnetic rack magnetic teeth having different polarities;

at least one first magnetic gear rotatable about at least one first axis, respectively, wherein each first magnetic gear has a plurality of first magnetic gear magnetic teeth and adjacent ones of the first magnetic gear magnetic teeth have different polarities;

at least one second magnetic gear rotatable about at least one second axis, respectively, wherein each second magnetic gear has a plurality of second magnetic gear magnetic teeth and adjacent ones of the second magnetic gear magnetic teeth have different polarities;

wherein:

the at least one first magnetic gear, in combination with the at least one second magnetic gear, forms at least one magnetic gear set, respectively;

the magnetic rack and the second magnetic gear are capable of magnetically engaging in a non-contact state with different first magnetic gear teeth of the first magnetic gear belonging to the same magnetic gear set via the magnetic rack magnetic teeth and the second magnetic gear teeth respectively; and in case that the at least one second magnetic gear is used as a driving gear to output power, the power is transmittable to the magnetic rack through the at least one first magnetic gear so as to move it along the first direction;

wherein:

a first direction of the first conveying apparatus is substantially parallel with and a first direction of the second conveying apparatus; and the magnetic rack magnetic teeth of the first conveying apparatus and magnetic rack magnetic teeth of the second conveying apparatus are arranged in a splayed form.

14. The transmitting system according to claim 13, wherein:

the magnetic rack of the first conveying apparatus has a fixed position relative to the magnetic rack of the second conveying apparatus.

* * * * *